(No Model.)

W. R. VAN VLIET.
Fruit Jar.

No. 241,095. Patented May 3, 1881.

WITNESSES
John N. Ellis.
Philip Bellwae

INVENTOR
Warren R. Van Vliet
by Anderson & Smith
his ATTORNEYS

UNITED STATES PATENT OFFICE.

WARREN R. VAN VLIET, OF EAST STROUDSBURG, PENNSYLVANIA.

FRUIT-JAR.

SPECIFICATION forming part of Letters Patent No. 241,095, dated May 3, 1881.

Application filed February 19, 1881. (No model.)

*To all whom it may concern:*

Be it known that I, WARREN R. VAN VLIET, a citizen of the United States, resident at East Stroudsburg, in the county of Monroe and State of Pennsylvania, have invented certain new and useful Improvements in Fruit-Jars; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
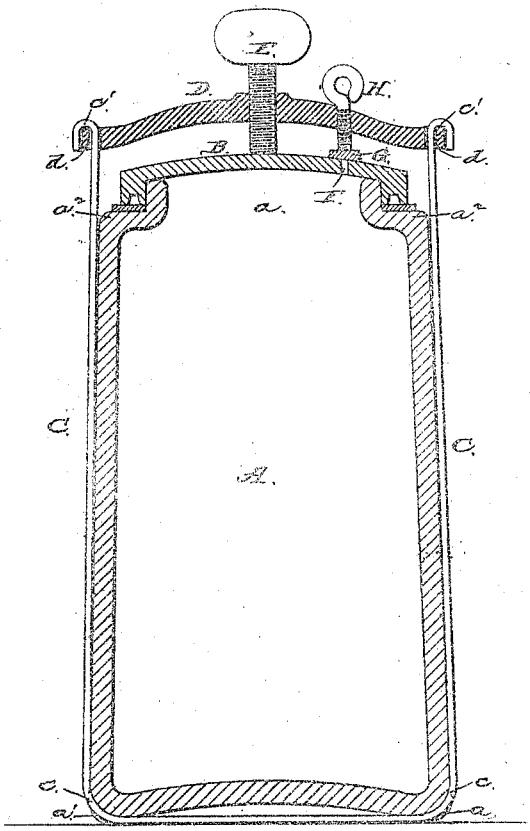
Figure 2:
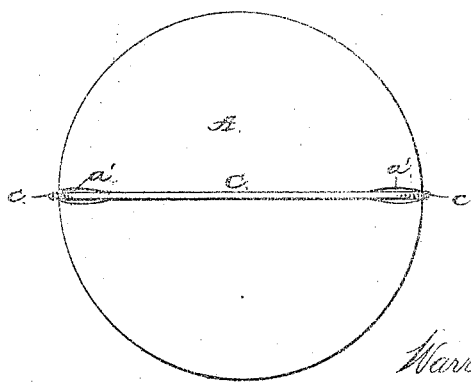

Figure 1 is a vertical section, and Fig. 2 a bottom view.

This invention relates to improvements in fruit-jars.

The object of the invention is the production of a jar from which all the air can be expelled and the same rendered air-tight, preventing mold; and the invention consists in the improved features of construction and combination hereinafter fully described, and particularly pointed out in the claim.

In the annexed drawings, A represents a jar having the neck $a$, and at the bottom the diametric grooves $a'$ $a'$. On shoulder $a^2$ the usual rubber ring is placed, and on this, over the neck $a$, is placed the cover B, having groove where it touches the rubber.

C is the wire loop, bent at $c$ $c$, where it is placed in the grooves $a'$ $a'$, and its upper ends, $c'$ $c'$, hooked in eyes $d$ $d$ at the ends of the cross-bar D, running across the cover B.

E is the screw passing through the middle of bar D and bearing on the center of the cover. This screw binds on the cover and holds it tight.

F is a vent-hole, to one side of the center, coming under the bar D.

G is a rubber piece for covering the hole.

H is a screw passing through the bar D and bearing on the rubber G.

In use the jar is filled as usual, the cover put on and tightened, the vent being left open. By the application of heat the air is driven through the vent, the jar can be closed air-tight by the rubber, and mold is prevented. Cooked fruit may be put in and additional sirup poured through the vent. Uncooked fruit may be put in, given a hot bath, and the vent closed after the heat has expanded and driven the air out.

What I claim is—

Jar A and cover B, having vent F, in combination with loop C, cross-bar D, rubber G, and screws E and H, substantially as and for the purposes set forth.

In testimony whereof I affix my signature in presence of two witnesses.

WARREN R. VAN VLIET.

Witnesses:
G. D. WHITE,
M. L. HUTCHINSON.